(12) United States Patent
Swvigaradoss et al.

(10) Patent No.: US 11,843,526 B2
(45) Date of Patent: Dec. 12, 2023

(54) AUTOMATIC AUTOMATION RECOMMENDATION

(71) Applicant: ServiceNow, Inc., Santa Clara, CA (US)

(72) Inventors: Jebakumar Mathuram Santhosm Swvigaradoss, Hyderabad (IN); Manjeet Singh, Milpitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/201,951

(22) Filed: Mar. 15, 2021

(65) Prior Publication Data

US 2022/0294710 A1 Sep. 15, 2022

(51) Int. Cl.
*H04L 41/5054* (2022.01)
*H04L 43/045* (2022.01)
*H04L 41/16* (2022.01)
*H04L 67/50* (2022.01)

(52) U.S. Cl.
CPC .......... *H04L 41/5054* (2013.01); *H04L 41/16* (2013.01); *H04L 43/045* (2013.01); *H04L 67/535* (2022.05)

(58) Field of Classification Search
CPC ... H04L 41/5054; H04L 43/045; H04L 67/22; H04L 41/16
See application file for complete search history.

(56) References Cited

U.S. PATENT DOCUMENTS

| | | | |
|---|---|---|---|
| 9,135,324 B1 * | 9/2015 | Hadar | G06Q 10/06 |
| 2006/0184410 A1 * | 8/2006 | Ramamurthy | G06Q 10/10 706/8 |
| 2014/0215077 A1 * | 7/2014 | Soudan | H04L 47/11 709/226 |
| 2019/0065990 A1 * | 2/2019 | Sharma | G06Q 20/00 |
| 2019/0268214 A1 * | 8/2019 | Maes | G06F 18/24 |

\* cited by examiner

*Primary Examiner* — Suraj M Joshi
*Assistant Examiner* — Jaren Means
(74) *Attorney, Agent, or Firm* — Van Pelt, Yi & James LLP

(57) ABSTRACT

At least service task data and application utilization data are collected. The collected data is analyzed to determine a utilization pattern. Based on the determined utilization pattern, a computer automation opportunity is automatically identified. An automatically generated recommendation of an automation solution among a plurality of automation solution candidates is provided for the identified computer automation opportunity.

20 Claims, 11 Drawing Sheets

AUTOMATIC AUTOMATION RECOMMENDATION

BACKGROUND OF THE INVENTION

To address a variety of different issues a business may face, a system of workflow processes can be implemented by the organization. Workflow processes allow complex scenarios to be addressed in an organized and repeated manner. For example, an employee reporting an IT incident may need a live customer agent to help guide the employee through the steps required for filling out the proper IT incident report. Once the report is submitted, a decision on how to assign and process the reported incident can be made. An assigned IT support agent will likely in turn implement their own IT workflow processes, likely made up of many individual workflow tasks in order to identify the problem, resolve the problem, and report on the resolution. In some scenarios, the assigned IT support agent may even need to rely on additional parties, including third-party vendors. Once the underlying issue with the IT incident has been resolved, a workflow process can ensure that there are no open tasks or issues before the incident report is closed. In various embodiments, the different tasks or portions of the workflow process can be complex, time-consuming, and difficult to manage. Digitizing and making the workflow process available as a cloud service can significantly increase the productivity associated with workflow processes while also reducing errors, lowering resource requirements, and providing a more consistent user experience. This can be especially true when the tasks are complex, repetitive, and/or include many individual steps.

BRIEF DESCRIPTION OF THE DRAWINGS

Various embodiments of the invention are disclosed in the following detailed description and the accompanying drawings.

DETAILED DESCRIPTION

Figure 1:
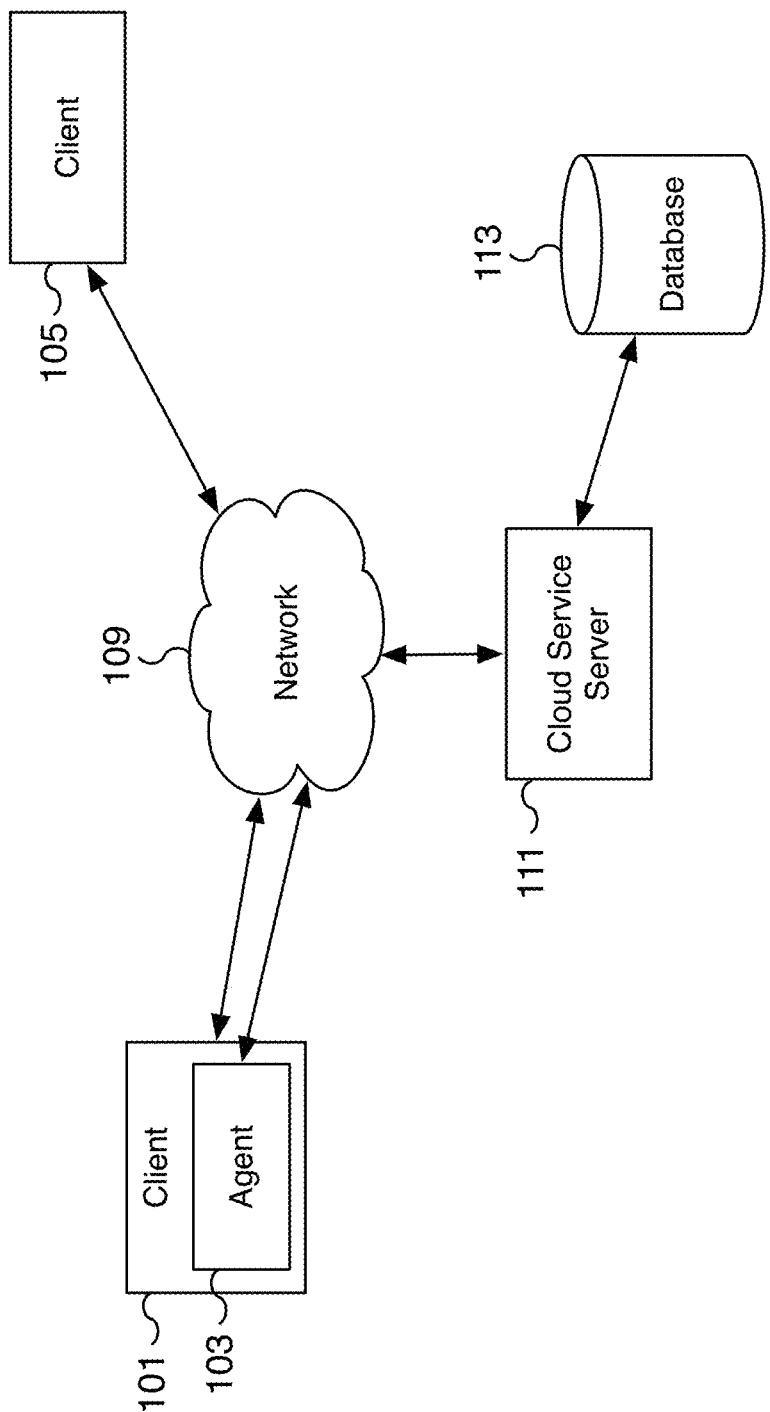
FIG. 1 is a block diagram illustrating an example of a cloud-based workflow process environment for automatically identifying and recommending automation recommendations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The automatic recommendation of automation opportunities for workflow processes is disclosed. Using the techniques disclosed herein, a workflow process can be analyzed according to a set of process rules applied to collected process data. For example, instrumentation is added to server and client-side processes to track analytics. The process rules are applied to the tracked analytics data and are used to identify automation opportunities in a workflow process. From the identified automation opportunities, portions of a workflow process are identified as candidates for automation. For example, a particular step or series of steps associated with resolving an IT incident can be identified using process rules as a bottleneck. The identified bottleneck can be surfaced as a candidate for automation. By automating the bottleneck, significant performance improvements are possible including the elimination of the bottleneck itself.

In some embodiments, candidates for automation are presented via an automation user interface. The automation user interface allows an administrator to review the automation candidates based on analyzed analytics and to confirm which portions of a process should be automated and how. In some embodiments, the candidates for automation include recommendations for how to automate the bottleneck. For example, a chat bot or conversation agent can be applied to address one type of bottleneck while a server-side process robot may be more appropriate for addressing another type of bottleneck. In various embodiments, an administrator can be presented with automation recommendations and confirm and/or customize the automation prior to implementation. Once the automation is implemented, additional analytics are gathered to track the performance associated with the automated solution. Results from automation implementation are provided to the administrator and can be used to evaluate the performance of the automated solution.

In some embodiments, at least service task data and application utilization data are collected. For example, a client agent installed on a client device collects client data including application utilization data such as mouse clicks, touch gestures, running applications, time spent between user interaction events, time spent with certain applications in focus, etc. The client agent can also monitor operating system events such as disk reads and writes, file system access, and/or network access, among system events. Server-side data can also be collected, for example, by a cloud server instance, and can include both client interaction data, service task data, as well as infrastructure data such as available memory, running processes, network utilization, etc. In various embodiments, the collected server-side data includes audit logs for tracking at least user events. In some embodiments, the collected data is analyzed to determine a utilization pattern. For example, the collected data is processed by matching the collected client data with the collected server data to determine utilization patterns. In some embodiments, the utilization patterns are determined by running process rules against the analyzed data to determine process analytics results. For example, process analytics results can correspond to the amount of time spent on a particular step of a process, the number of times a step is repeated, the client and/or server input of a step, the output of a step, etc. In some embodiments, a computer automation opportunity is automatically identified based on the determined utilization pattern. For example, a step in a workflow process is identified as an automation opportunity based on process analytics results. In some embodiments, an automatically generated recommendation of an automation solution among a plurality of automation solution candidates for the identified computer automation opportunity is provided. For example, an automatically generated recommendation for an automated solution is presented to the user via an automation user interface to address one of potentially several identified bottlenecks or automation opportunities. As one example, an automatically generated recommendation may be the implementation of a chat or conversation bot to help navigate a user through a series of complex steps. As another example, an automatically generated recommendation may be a server-side robot for automating a series of complex server-side process steps that require access to multiple databases each with its own complex login process. In various embodiments, the recommendation is accepted by an operator and implemented as an automation solution. For example, using an automation user interface, an operator can implement the automation solution and also track analytics associated with the automation, such as conversation analytics to quantify the benefits of the automation.

FIG. 1 is a block diagram illustrating an example of a cloud-based workflow process environment for automatically identifying and recommending automation recommendations. In the example shown, client 101 accesses cloud-based services on cloud service server 111 via network 109. The services offered by cloud service 111 can include process workflows as well as automation workflow tools for creating, managing, and executing automated process workflows. In various embodiments, whereas client 101 is used to execute process workflows, for example, by employees or clients of a business organization, client 105 is an example of a client used by an operator for managing the process workflows. For example, client 105 can be used to access an automation user interface for identifying automation opportunities and implementing automation solutions. In the example shown, cloud service server 111 is communicatively connected to database 113. Database 113 can be utilized as a cloud datastore for both temporary and persistent data storage including for storing data associated with the workflow processes, automated workflows, and automated solutions. Network 109 can be a public or private network. In some embodiments, network 109 is a public network such as the Internet. In various embodiments, the workflow processes performed via client 101 can be monitored by agent 103 and/or cloud service server 111. For example, agent 103 is a client agent installed on client 101 for monitoring client usage to help identify automation opportunities.

In various embodiments, usage patterns and user behavior are monitored, and the associated data such as application utilization data is captured. For example, user actions associated with initiating a ticket to report a problem incident using cloud service server 111 via client 101 are tracked by agent 103 and cloud service server 111. For example, agent 103 can track the time a user spends in each associated application, such as an email application, a web browser, and document reader. Agent 103 can also track user interactions, such as mouse clicks and input from other devices such as keyboards and trackpads, as well as visited cloud service websites and associated network destinations. Agent 103 can also be configured to monitor operating system events, such as file access, network access, and/or device access, etc. In various embodiments, agent 103 is configured to protect the privacy and security of the client user while also allowing analytics to be tracked to identify automation opportunities. For example, user information can be anonymized and tracking limited to pre-approved or opted-in applications, network destinations, and/or other resources. In various embodiments, interactions with the user are also tracked on the server side using cloud service server 111. For example, events corresponding to servicing user actions are tracked and matched to the client data to build a detailed understanding of usage patterns and user behaviors. System resources such as memory usage, network utilization, database access, and other resources along with service tasks can also be monitored. By capturing the related data, automation opportunities can be identified. For example, the captured data can be processed by one or more process rules for a business workflow. Based on the process analytics results, one or more steps of the business workflow are identified as candidates for automation.

In some embodiments, an operator accesses the automatically identified automation opportunities via an automation user interface running on cloud service server 111. For example, an operator can access the automation user interface from client 105 via a network client such as a web browser. In various embodiments, the automation opportunities include one or more automatically generated automation solution recommendations. The recommendation and automation opportunities can be presented with automation analytics to help quantify potential improvements from automation and to identify and differentiate bottlenecks. In various embodiments, an operator can implement an automation solution to address an automation opportunity. Once an automation solution is implemented, additional automation analytics can be collected to track the improvement of and/or improve the implemented automation solution. In various embodiments, clients accessing the automated workflow process continue to access the process using a manner similar to the pre-automation scenario but now with one or more automation solutions included in the workflow.

Although single instances of some components have been shown to simplify the diagram, additional instances of any of the components shown in FIG. 1 may exist. For example, cloud service server 111 may include one or more cloud server instances. Similarly, database 113 may not be directly connected to cloud service server 111 and/or may be replicated or distributed across multiple components, such as multiple cloud-based databases. As another example, clients 101 and 105 are just two examples of potential clients for accessing cloud service server 111. Fewer or more clients can connect to cloud service server 111. In some embodiments, components not shown in FIG. 1 may also exist.

Figure 2:
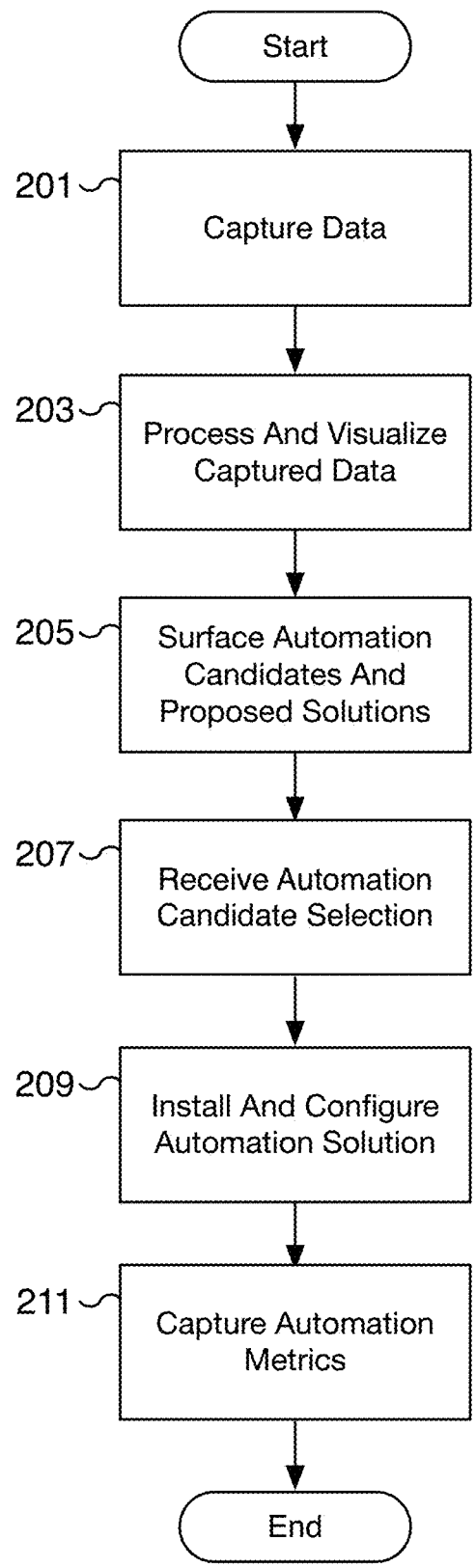
FIG. 2 is a flow chart illustrating an embodiment of a process for automatically identifying and recommending automation recommendations.

FIG. 2 is a flow chart illustrating an embodiment of a process for automatically identifying and recommending automation recommendations. Using the process of FIG. 2, a workflow process can be automatically analyzed to identify potential automation opportunities. Suggested automation solutions can be identified and integrated into the workflow process to address the bottlenecks identified by the potential automation opportunities. In some embodiments, the process of FIG. 2 is performed to improve a workflow process running on a cloud-based workflow process environment such as FIG. 1 by identifying and installing one or more automated solutions. For example, the workflow is performed by clients of client 101 of FIG. 1 using a cloud service hosted by cloud service server 111 of FIG. 1. Analytics data of the workflow process is collected, for example, by an agent running on a client such as agent 103 of FIG. 1 and by one or more server processes running on the cloud service. An operator can manage the automation of the workflow process via a separate client such as client 105 of FIG. 1 using an automation user interface service hosted by cloud service server 111 of FIG. 1. In various embodiments, the tracked automation analytics data and data for surfacing and implementing an automated solution are stored on a cloud store such as database 113 of FIG. 1.

At 201, data is captured. For example, data is captured across multiple stages of a process workflow. In some embodiments, the data is captured at the client end using a client agent. The captured data can include application utilization data to determine how a user interacts with a process workflow. In various embodiments, the data captured includes data associated with different applications, processes, and system events of the client device in addition to data associated with the software client (such as a web browser) used to access cloud-based services. Additional data is also captured at the server end, for example, for server tasks, infrastructure data, and client events, among other analytics data. In various embodiments, data can also be captured using intermediary network devices, such as proxies, that exist between the client and the cloud service. In some embodiments, data is also captured at the data store to collect analytics information on accessed data including the type and size of the data and associated data operations.

At 203, captured data is processed and visualized. For example, the captured data is analyzed to identify automation candidates. In some embodiments, the client and server data are merged, for example, to match corresponding events captured from different ends of a transaction. In various embodiments, the data is processed and prepared for visualization. For example, a graphical user interface such as an automation user interface or dashboard is provided to visualize the process workflow. An operator managing the workflow and/or associated cloud service and clients can access an automation user interface and visualize the workflow process. The automation user interface can display the monitored workflow process along with analytics data based on data captured at 201 that describes the performance of the process.

At 205, automation candidates and proposed solutions are surfaced. For example, one or more automation candidates are presented to the operator via an automation user interface. The automation candidates can correspond to inefficiencies in the workflow process that can benefit from automation. In some embodiments, the automation candidates correspond to workflow bottlenecks such as repeating the same series of steps multiple times and can be characterized by their utilization patterns. In various embodiments, the automation candidate is presented with analytics data that helps describe the context of the candidate. For example, a bottleneck may be displayed with the average amount of time a user takes to complete the step or a metric associated with the number of users that quit the process at the specific step. In various embodiments, the automation user interface also displays proposed solutions for automation candidates along with estimated performance metrics associated with installing a proposed solution. For example, an automation opportunity can be automated via multiple automation solutions and one or more proposed solutions are suggested for the operator. As one example, an automation solution can include the use or inclusion of a help chat bot or conversation agent to clarify the fields required for a form submission. As another example, an automation solution can include the use or inclusion of a server-side or automated service task process robot to automate a particularly complex and tedious step that is prone to the same errors. The automated service task process robot can also be installed to replace identified manual service tasks. In some embodiments, the automation solution involves generating a machine learning model to infer results associated with a workflow utilization pattern. The machine learning model is trained and installed for predicting results as part of an automated solution for the workflow process.

At 207, an automation candidate selection is received. For example, an operator specifies an automation solution from a proposed solution presented at 205 to address a particular automation opportunity. The solution can be selected by an operator with little or no programming knowledge using an automation user interface and can be provided to the cloud service. In some embodiments, the automation candidate selection is automatically selected and received at 207 without an operator.

At 209, an automation solution is installed and configured. For example, the automation candidate selection received at 207 can be modified and/or configured for the particular automation opportunity and installed into the process workflow. For example, an operator can want to customize the automation solution by specifying one or more fields of a help database to provide more detailed help responses for a chat bot. In various embodiments, the additional configuration at 209 can allow the automation solution to more closely address the automation opportunity identified at 205. Once the automation is configured, the automation solution is activated and installed as part of the revised process workflow.

At 211, automation metrics are captured. For example, automation metrics similar to the analytics data captured at 201 are captured. The additional captured data is used to monitor the automation solution and can be used to identify the performance of the newly installed solution. The automation metrics can be captured using the same processes utilized at 201 along with additional capture agents associated with the automation solution. For example, a chat bot (or conversation agent) installed as part of an automation solution can include additional automation data capture processes that are used to supplement other analytics data that is regularly captured as part of the workflow process.

Figure 3:
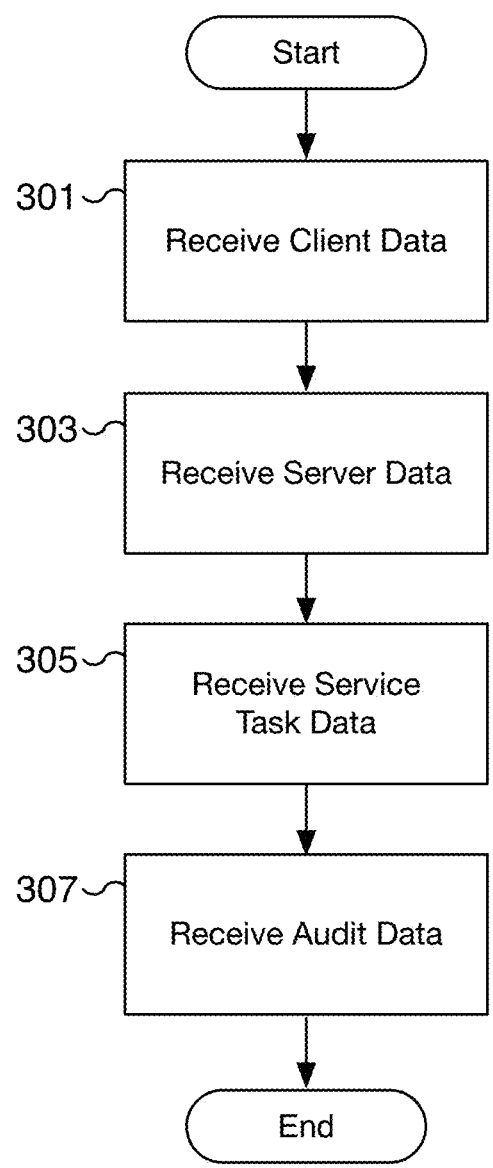
FIG. 3 is a flow chart illustrating an embodiment of a process for capturing data associated with a workflow process to identify automation opportunities.

FIG. 3 is a flow chart illustrating an embodiment of a process for capturing data associated with a workflow process to identify automation opportunities. Using the process of FIG. 3, a workflow process is monitored and analytics data of the process is captured for later analysis. Using the captured analytics data, automation opportunities and automation solutions can be identified. In various embodiments, data associated with the workflow process can be captured prior to the start of the workflow process, during the workflow process, and after the workflow process is complete as well as from different points of reference. By capturing data before and after the workflow process and from different points of reference, a detailed and accurate analysis of a workflow process can be performed. In various embodiments, the data is captured from different points of reference of the workflow process such as at client 101 of FIG. 1, at cloud service server 111 of FIG. 1, and/or at database 113 of FIG. 1. In some embodiments, a client agent such as agent 103 captures client data from a workflow process client to capture the data only available from the client's perspective. In various embodiments, the process of FIG. 3 is performed at 201 of FIG. 2.

At 301, client data is received. For example, client data is captured from a client such as client 101 of FIG. 1. In some embodiments, the client data is also captured at least in part by using a client agent such as agent 103 of FIG. 1. The client agent can capture user behavior performed outside of a software client such as the interactions performed with third-party applications and the client operating system. In various embodiments, the client data received can include client-side analytics data such as the time a user spends in each associated application, such as an email application, a web browser, and document reader. The received client data can also include tracked user interactions, such as mouse clicks and input from other devices such as keyboards and trackpads, as well as visited cloud service websites and associated network destinations. In various embodiments, the received client data is collected in a manner as to protect the privacy and security of the client user while also allowing analytics to be tracked to identify automation opportunities. For example, user information can be anonymized and tracking limited to pre-approved or opted-in applications, network destinations, and/or other resources.

At 303, server data is received. For example, server-side data associated with client behavior such as client interactions during client sessions is received. The server-side data can correspond to actions performed by a client but are tracked from the perspective of the server. In various embodiments, the server-side data is tracked by a cloud service server such as cloud service server 111 of FIG. 1. In various embodiments, interactions with the user are tracked from the server perspective and can be matched with corresponding client behavior tracked from the client perspective. For example, events corresponding to servicing user actions are tracked and can be matched to the client data during an analysis step to build a detailed understanding of usage patterns and user behaviors.

At 305, service task data is received. In some embodiments, service task data received is tracked by server-side processes. The service task data can include analytics data associated with server processes used to process service tasks associated with a workflow process. In some embodiments, the service task data is associated with the server-side data received at 303 but associated service task data can be received as a separate step, for example, as data is received from one or more different task processes or sub-processes.

At 307, audit data is received. For example, server audit data including audit logs or cloud-based server processes, client events, operating system events, hardware and software infrastructure related events, etc. is received. In various embodiments, the audit data can correspond to audit trails tracked by processes running on the cloud service. The audit data can provide analytics data corresponding to user behavior that can only be captured from outside of the context of the client session. For example, infrastructure data can be tracked from the audit data received and can include data associated with system resources such as memory usage, network utilization, database access, and other resources.

Figure 4:
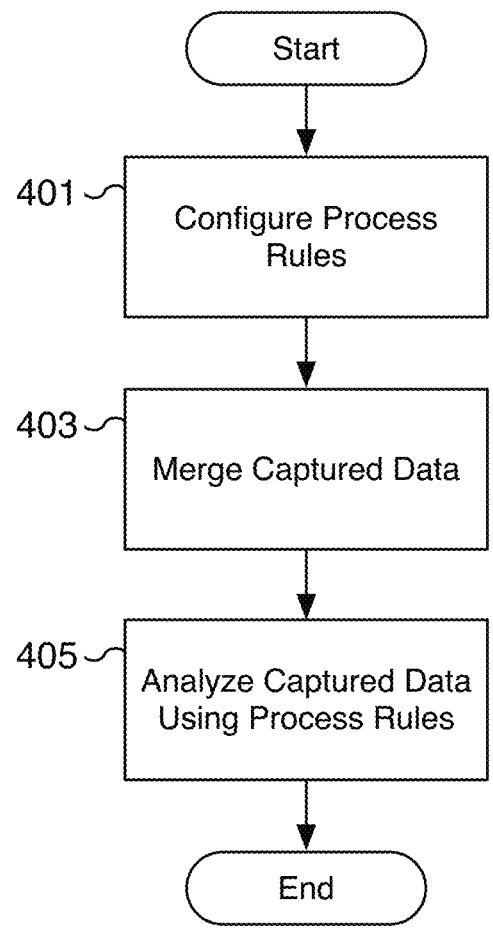
FIG. 4 is a flow chart illustrating an embodiment of a process for analyzing captured analytics data of a workflow process.

FIG. 4 is a flow chart illustrating an embodiment of a process for analyzing captured analytics data of a workflow process. Using the process of FIG. 4, analytics data captured of a workflow process is processed based on configured process rules. The analysis is used to identify automation opportunities and solutions. In some embodiments, the process of FIG. 4 is performed at 203 of FIG. 2 using the data received by the process of FIG. 3. In some embodiments, the process of FIG. 4 is performed by a cloud service server such as cloud service server 111 of FIG. 1.

At 401, process rules are configured. For example, one or more process rules are configured for a workflow process. Each workflow process can be configured with different sets of process rules in order to track different analytics. For example, an IT ticket workflow process can require a different set of process rules than an onboarding workflow process for a new hire. The configured process rules allow for customization of analytic metrics that are used to identify automation opportunities. In various embodiments, a process rule can be dependent on captured analytics variables such as the amount of time a user spends at a particular step, the number of times a user repeats a particular step, the length of time a spawned service task process takes to complete a step, etc. In some embodiments, an operator can input and/or configure process rules using an automation user interface. In some embodiments, a default set of process rules are provided for a workflow process.

In some embodiments, each process rule is configured with a threshold parameter. The threshold parameter can be used to determine whether the associated process analytics result triggers the identification of an automation opportunity. For example, in the event the process rule exceeds the configured threshold parameter, the associated workflow process step is identified as an opportunity for automation. In some embodiments, the threshold parameter is expressed as a threshold value, a threshold range, a threshold percentage, or another threshold format as appropriate. In some embodiments, one or more process rule results can be combined to evaluate a process analytics result that is used to compare to a configured threshold value.

In some embodiments, one or more threshold values corresponding to the required amount of sufficient data to be captured before automation opportunities can be identified are also configured. For example, the required amount of data can be configured by specifying a minimum threshold amount of time, a minimum number of iterations of the workflow process, a minimum number of iterations of the workflow process for a particular client profile, and/or one or more other appropriate threshold requirements.

At 403, captured data is merged. In various embodiments, the data captured from monitoring the workflow process is merged. As a workflow process is monitored, the analytics data represents data captured from different perspectives, such as from a client-side perspective, a network perspective, a server-side perspective, a sub-task perspective, etc. At 403, the data is processed to align the different perspectives and to provide a more detailed and complete capture of user behavior. In some embodiments, the merged data includes data captured prior to and after the workflow process. For example, if a user copies text data from an email client prior to starting a workflow process, the actions performed in the email client can be relevant and are used for the analysis step. Similarly, actions performed after a workflow process is complete can also be relevant. For example, a confirmation date may be provided at the end of the workflow process. Data captured by monitoring the user's behavior after the workflow process completes can identify that many users switch to an email application to email the confirmation date to themselves or to a calendaring application to add a calendar entry for the confirmation date. The captured analytics data for the post-workflow actions is merged to create a more detailed understanding of the workflow process and can surface automation opportunities such as including automated steps to the workflow process for sending a confirmation email and/or calendar entry.

At 405, captured data is analyzed using configured process rules. For example, the data merged and aligned at 403 is analyzed using the process rules configured at 401. In various embodiments, the process rules configured at 401 are configured to apply to the data merged at 403. By applying the process rules on the captured data, process rule metrics or process analytics results are determined. The process analytics results can be run on different granularities of the workflow process. In some embodiments, process analytics results are determined for each step of the workflow process and the results associated with different steps of the workflow process can be used to rank the steps in terms of opportunities for automation. In various embodiments, the identified automation opportunities correspond to identified utilization patterns that could benefit from automation. In some embodiments, the process analytics results are performed on a group of collective tasks or across multiple workflow process steps and automation opportunities can be applied to a sequence of steps, for example, to streamline multiple steps into a single step. Using the process analytics results, one or more automation opportunities can be surfaced and presented to an operator for evaluating automation solutions.

In some embodiments, the analysis at 405 is only performed after a sufficient amount of relevant data has been captured. The amount of required data can be configured. For example, the required amount of data can be configured by specifying a minimum threshold amount of time, a minimum number of iterations of the workflow process, a minimum number of iterations of the workflow process for a particular client profile, and/or one or more other appropriate threshold requirements. In some embodiments, the captured data requirement is specified as part of configuring the process rules for the workflow process at 401.

Figure 5:
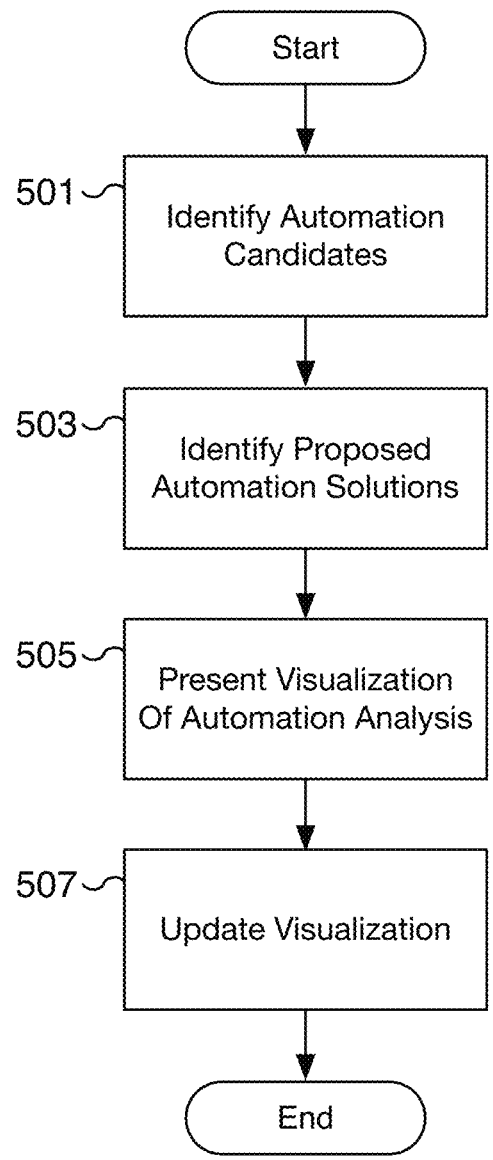
FIG. 5 is a flow chart illustrating an embodiment of a process for visualizing and configuring automation opportunities of a workflow process.

FIG. 5 is a flow chart illustrating an embodiment of a process for visualizing and configuring automation opportunities of a workflow process. Using the process of FIG. 5, an operator can evaluate automatically identified automation opportunities using an automation user interface. The operator can further select and install a recommended automation solution to address an automation opportunity. In some embodiments, the operator utilizes a remote client such as client 105 of FIG. 1 to access an automation interface running on a cloud service server such as cloud service server 111 of FIG. 1 of a cloud service. In some embodiments, the process of FIG. 5 is performed at 205, 207, and/or 209 of FIG. 2.

At 501, automation candidates are identified. For example, process analytics results are evaluated using configured process rules to determine utilization patterns and identify automation candidates. The process analytics results are compared to configured threshold parameters to identify automation candidates. The automation candidates can be individual steps of a workflow process, a series of steps of a workflow process, a branch of the workflow process, or another combination of workflow process steps. In some embodiments, the automation candidates are identified after processing captured user behavior and system data. For example, the automation candidates may be identified only after performing the process of FIG. 4 to analyze captured analytics data of a workflow process. The identified automation candidates can correspond to bottlenecks of the workflow process that potentially offer opportunities for improvement by utilizing automated solutions.

At 503, proposed automation solutions are identified. Based on the automation candidates identified at 501, one or more proposed automation solutions are identified. In various embodiments, the automation opportunity is characterized as one of several automation opportunity categories. The automation category can be determined based on the type of input, type of output, dependent values, and other features of the workflow process and/or identified automation candidate steps. For example, an automated solution utilizing a conversation agent or chat bot requires a predefined set of workflow process characteristics for the chat bot automation solution to be a recommended solution. Similarly, a server-side process robot requires a different predefined set of workflow process characteristics for it to be a recommended solution. At 503, proposed automation solutions are identified using templated solutions associated with each automation category. The solutions are then customized using the parameters and/or features of the specific workflow process. For example, a customized help database table can be configured as a backend for a conversation agent to provide customized responses using the specialized knowledge stored in the identified database table. As another example, a server-side process robot can be configured to automate the performing of the specialized sequence of server-side tasks identified by the automation opportunity. For example, the identified sequence of server-side tasks may be particularly complex, time-consuming, require manual steps, repetitive, and/or prone to error, etc. In some embodiments, the manually determined outputs of an identified automation opportunity are replaced with a machine learning model solution. The model can be trained based on the collected input data and output results. Once trained, the machine learning model can be used to predict or infer output results to replace the manually determined outputs associated with the automation opportunity.

At 505, a visualization of the automation analysis is presented. For example, an operator interacting with an automation user interface is presented with the automation opportunities identified at 501 and the corresponding proposed automation solutions identified at 503. The presented data is provided as one or more graphical visualizations which present the operator with a more detailed understanding of the workflow process, the workflow process steps, and associated process analytics results. Workflow process steps can be identified as automation opportunities and are displayed with associated process analytics results. By associating and providing metrics for the workflow process steps, an operator can determine which automation opportunities may warrant installing an automated solution. For example, an automation user interface may display the number of manual activities associated with a workflow process along with a recommendation that a certain set of the steps associated with the manual activities is automated with a proposed automation solution. As another example, the automation user interface may surface a workflow process step that exceeds a process rule threshold configuration as an opportunity for automation and display the number of times the step is needlessly repeated. A provided proposed automation solution can reduce the errors causing the needless repetitions.

In some embodiments, the automation user interface further provides estimated metrics associated with a proposed automation. For example, an automation dashboard can provide estimated performance metrics such as potential savings associated with installing an automated solution for an automation opportunity. The potential savings can include estimated savings in processing time or resources, estimated savings in employee time, and/or estimated monetary savings, among other estimated metrics. The automation dashboard can also include current metrics such as the currently used processing time, currently used employee time, and current monetary costs for comparison.

At 507, automation visualizations are updated. In various embodiments, once an automation solution is configured, modified, and/or installed, the automation visualizations including process analytics results and estimated metrics are updated to reflect the current or to be improved state of the workflow process. The visualizations can include metrics captured from the updated workflow process that include one or more automated solutions. By monitoring the workflow process with installed automation solutions, the automation user interface can provide actual performance metrics to complement the previously estimated metrics. The provided metrics can also be used to tune and/or configure an automated solution to improved workflow process results. In some embodiments, the actual performance metrics are further used to improve the accuracy of predicted estimated metrics.

Figure 6:
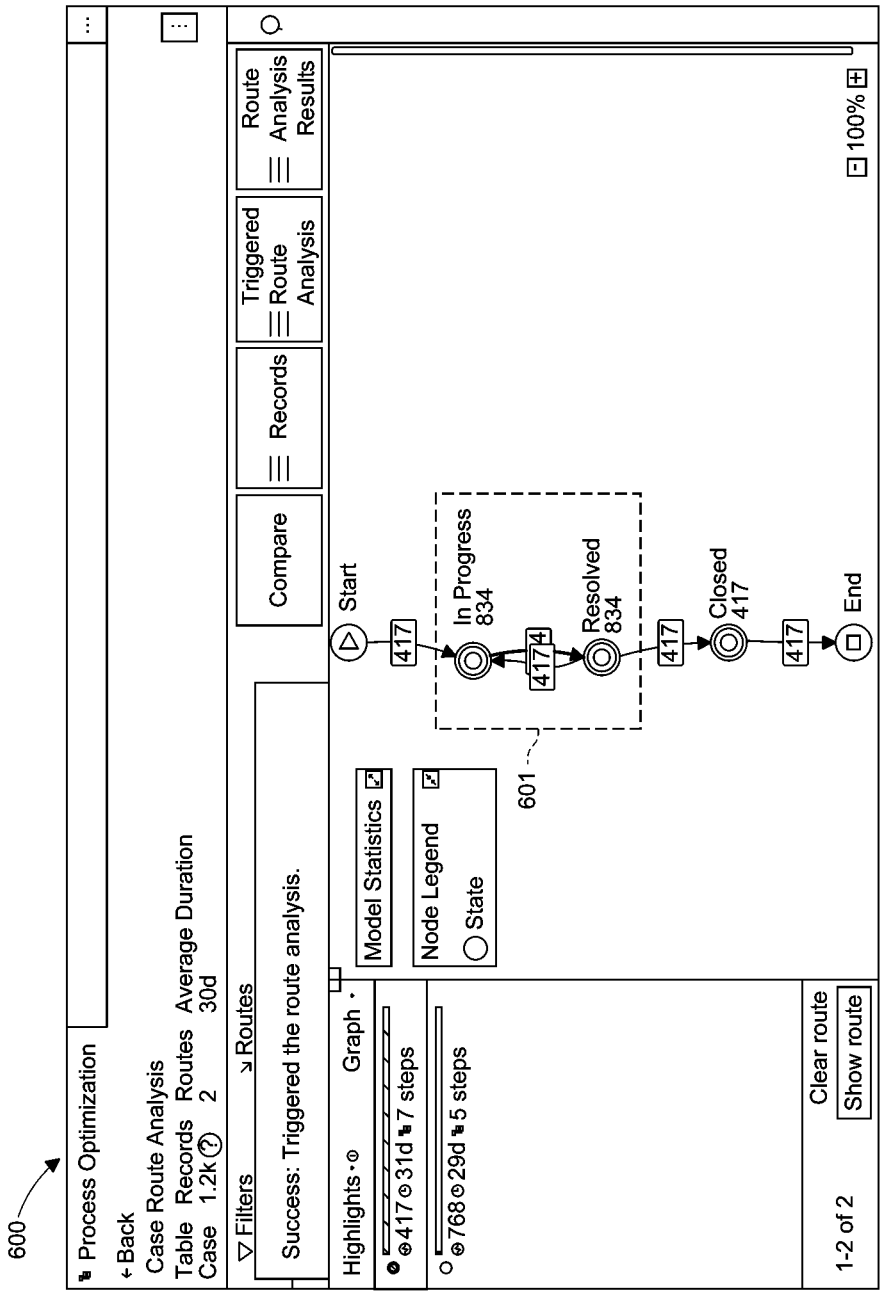
FIG. 6 is a diagram illustrating an embodiment of an automation user interface for identifying automation opportunities in a workflow process.

FIG. 6 is a diagram illustrating an embodiment of an automation user interface for identifying automation opportunities in a workflow process. In the example shown, automation user interface 600 is an example embodiment of a user interface for presenting an automation opportunity to an operator using a visualization of the workflow process. As shown in the example, automation user interface 600 includes identified automation opportunity 601 corresponding to a subset of workflow steps of the workflow process. In some embodiments, automation user interface 600 is provided by a cloud service hosted by a cloud service server such as cloud service server 111 of FIG. 1. In some embodiments, an operator accesses automation user interface 600 via a client such as client 105 of FIG. 1. In various embodiments, automation user interface 600 is provided at 203 and/or 205 of FIG. 2 and/or 505 and/or 507 of FIG. 5.

In the example shown, automation user interface 600 displays steps of a workflow process along with captured and/or process analytics results associated with steps of the process. As shown in the example, identified automation opportunity 601 includes a highlighted route between two steps of the workflow process determined by analyzing the captured user behavior and system data. The highlighted route is shown with the thicker arrow between the two steps of identified automation opportunity 601 and corresponds to a particular utilization pattern. As seen in identified automation opportunity 601, there is a loop between the two steps that could be introducing redundancy or reflect other issues that can be optimized. By analyzing the captured data, the redundancy of the utilization pattern is identified and surfaced as an automation opportunity. In the example shown, the analysis performed includes a case route analysis to determine which routes are being performed sub-optimally. In some embodiments, the analysis is performed using the process of FIG. 4.

Figure 7:
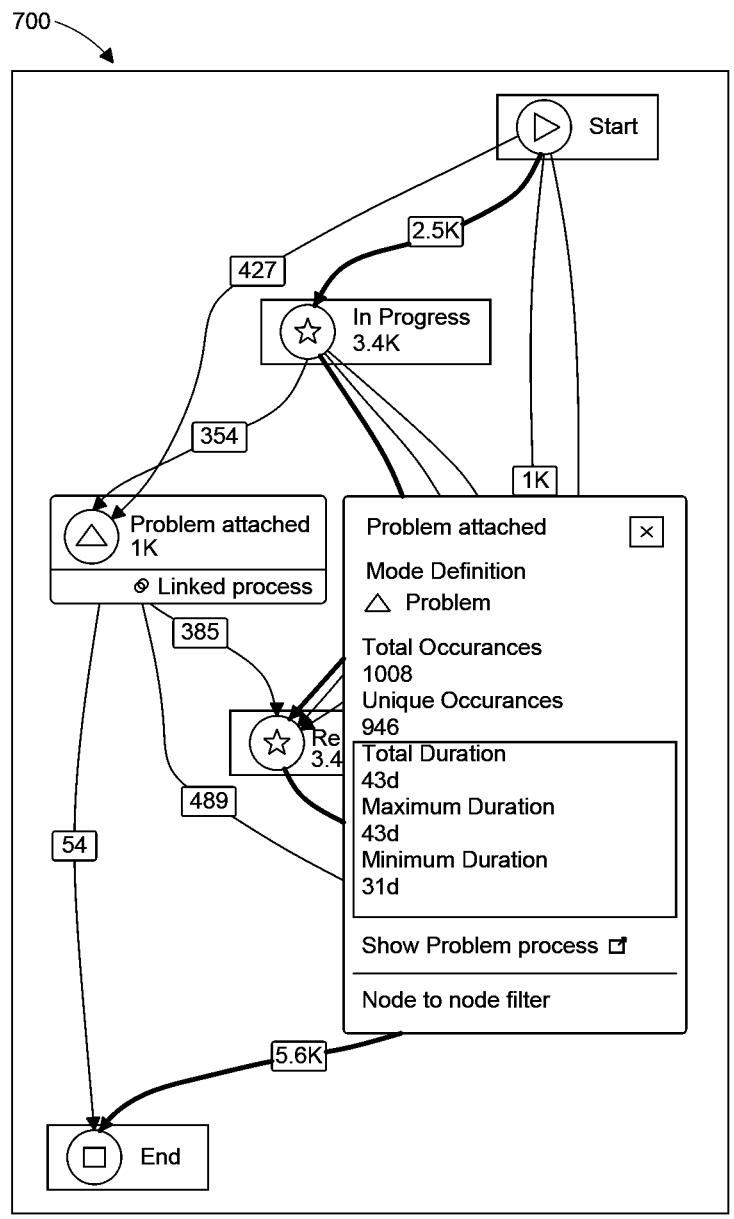
FIG. 7 is a diagram illustrating an embodiment of an automation user interface for identifying automation opportunities in a workflow process.

FIG. 7 is a diagram illustrating an embodiment of an automation user interface for identifying automation opportunities in a workflow process. In the example shown, automation user interface 700 is an example embodiment of a user interface for presenting an automation opportunity to an operator using a visualization of the workflow process along with captured and/or process analytics results. As shown in the example, automation user interface 700 includes an identified automation opportunity corresponding to a subset of workflow steps of the workflow process and also corresponds to the workflow process shown in FIG. 6. In some embodiments, automation user interface 700 is provided by a cloud service hosted by a cloud service server such as cloud service server 111 of FIG. 1. In some embodiments, an operator accesses automation user interface 700 via a client such as client 105 of FIG. 1. In various embodiments, automation user interface 700 is provided at 203 and/or 205 of FIG. 2 and/or 505 and/or 507 of FIG. 5.

In the example shown, automation user interface 700 displays additional information not shown in automation user interface 600 of FIG. 6. For example, automation user interface 700 may be presented to the operator when the operator requests more detailed information of automation opportunity 601 of FIG. 6. In the example shown, additional captured data including process analytics results are shown and associated with the automation opportunity. The included analytics data includes metrics such as the total number of occurrences of the identified problem associated with the automation opportunity, the unique number of occurrences of the identified problem, the total duration spent on the identified problem, the maximum duration spent on the identified problem, and the minimum duration spent on the identified problem. Additional user interface elements of automation user interface 700 allow the operator to drill down to reveal additional information such as the process associated with the identified automation problem and configurable filters for refining the shown data.

Figure 8:
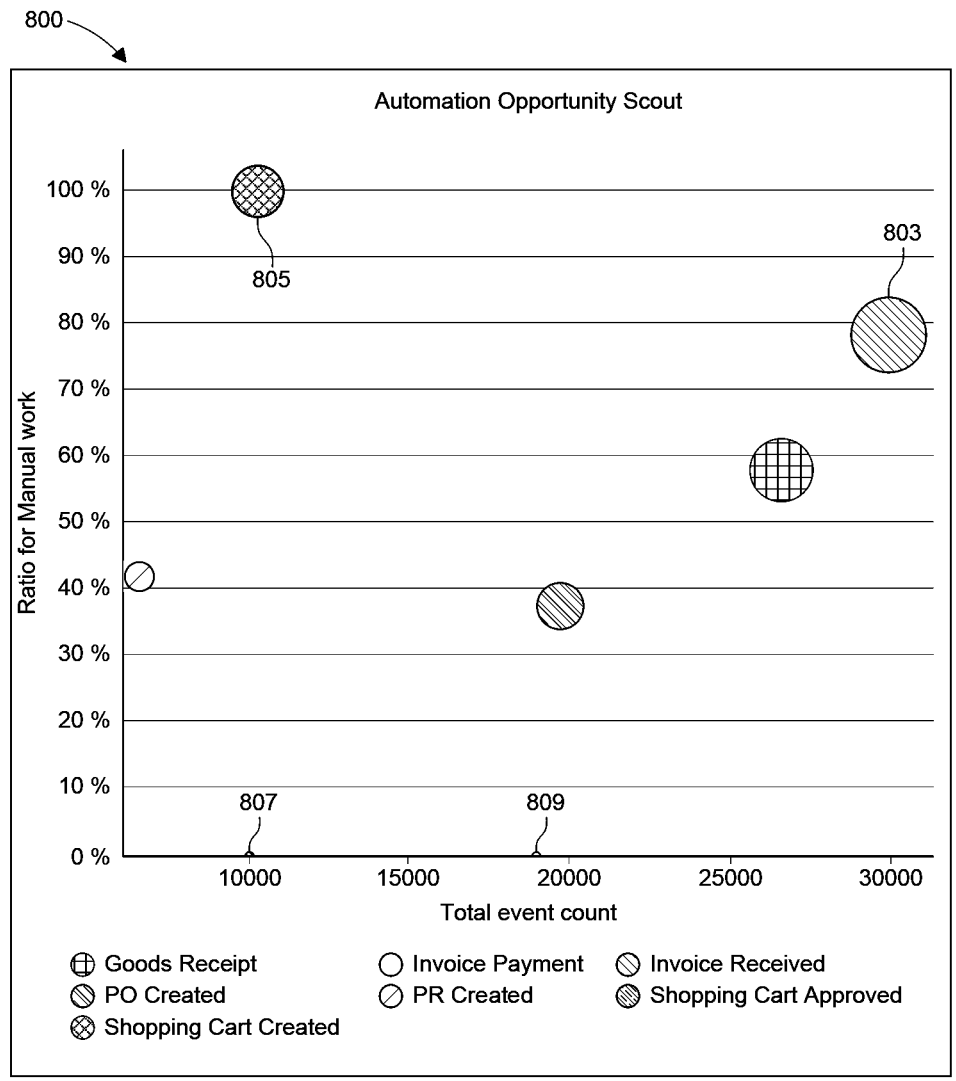
FIG. 8 is a diagram illustrating an embodiment of an automation user interface for identifying automation opportunities in a workflow process.

FIG. 8 is a diagram illustrating an embodiment of an automation user interface for identifying automation opportunities in a workflow process. In the example shown, automation user interface 800 is an example embodiment of a user interface for visualizing identified automation opportunities of the workflow process by event categories. In some embodiments, automation user interface 800 is provided by a cloud service hosted by a cloud service server such as cloud service server 111 of FIG. 1. In some embodiments, an operator accesses automation user interface 800 via a client such as client 105 of FIG. 1. In various embodiments, automation user interface 800 is provided at 203 and/or 205 of FIG. 2 and/or 505 and/or 507 of FIG. 5.

In the example shown, automation user interface 800 displays analyzed analytics data from captured data of a workflow process. The displayed data is presented as event categories. In the example shown, seven categories of events have been identified. For each event, a total event count has been tracked and a ratio of manual work associated with the event has been determined. Each event is visualized on the 2-dimensional graph with total event count along the X-axis and ratio for manual work along the Y-axis. Each event represents an identified automation opportunity. By presenting the analytics data using a 2-dimensional visualization of automation factors (e.g., count and manual work), an operator can confirm which events to prioritize for automation.

In the example shown, Invoice Received event 803 has the highest total event count and the second highest ratio for manual work and Shopping Cart Created event 805 has the fourth lowest total event count but the highest ratio for manual work. Both events would likely benefit from automation. In contrast, both Shopping Cart Approved event 807 and Invoice Payment event 809 have a ratio of manual work that is close to 0%. This indicates that neither event would be a good candidate for further automation. By presenting the different factors that impact improvement when installing an automated solution, an operator can determine which factor or factors to prioritize and which automation opportunities to focus on.

Figure 9:
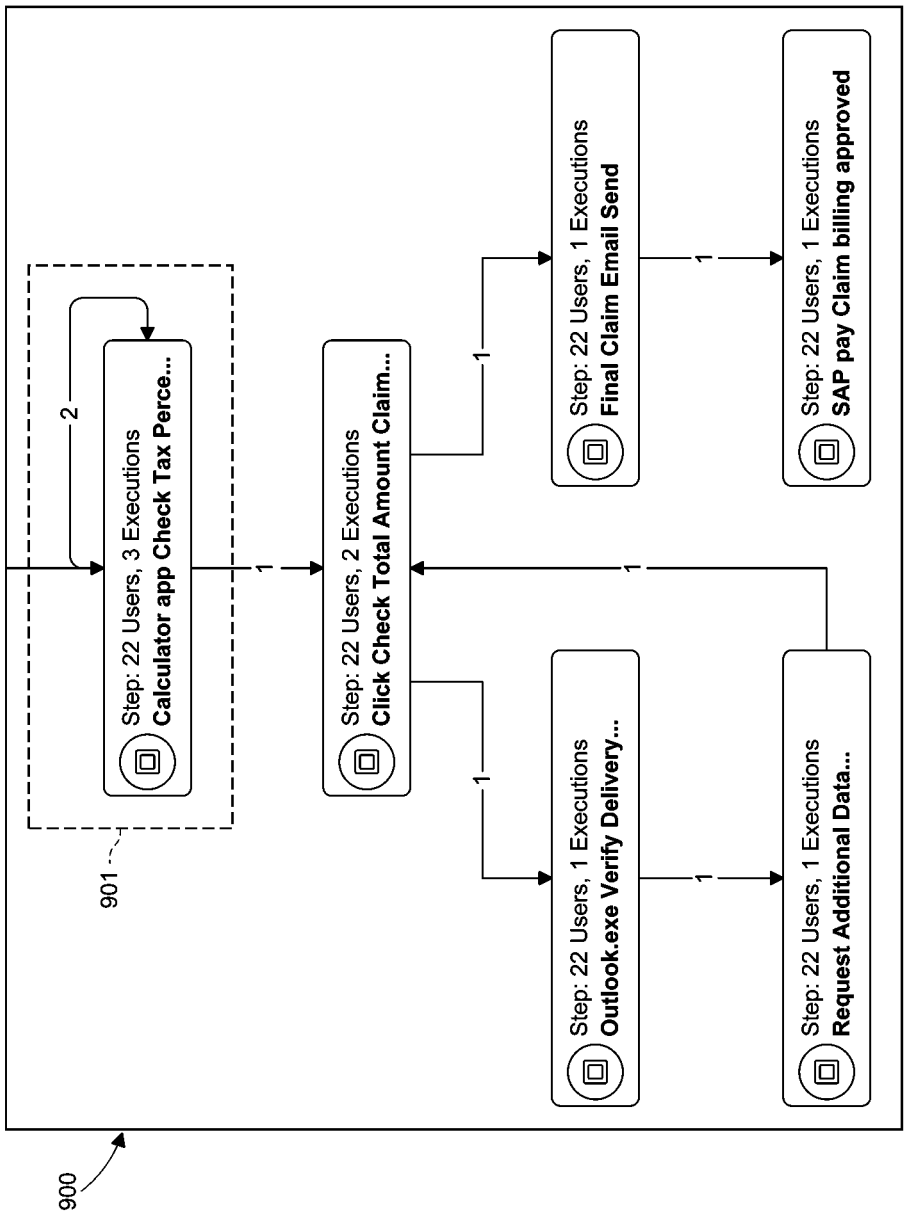
FIG. 9 is a diagram illustrating an embodiment of an automation user interface for identifying automation opportunities in a workflow process using client-side data.

FIG. 9 is a diagram illustrating an embodiment of an automation user interface for identifying automation opportunities in a workflow process using client-side data. In the example shown, automation user interface 900 is an example embodiment of a user interface for presenting an automation opportunity to an operator using a visualization of the workflow process. The example of FIG. 9 utilizes data captured from and only available from a client-side perspective, such as data captured using a client agent such as application utilization data. As shown in the example, automation user interface 900 includes identified automation opportunity 901 corresponding to a workflow step of the workflow process. In some embodiments, automation user interface 900 is provided by a cloud service hosted by a cloud service server such as cloud service server 111 of FIG. 1. In some embodiments, an operator accesses automation user interface 900 via a client such as client 105 of FIG. 1. In various embodiments, automation user interface 900 is provided at 203 and/or 205 of FIG. 2 and/or 505 and/or 507 of FIG. 5.

In the example shown, automation user interface 900 displays steps of a workflow process that are outside of the services provided by a cloud service. For example, automation opportunity 901 is a step where a client user utilizes a calculator program available only as a client application. Other steps include using another third-party email application. As shown in the example, identified automation opportunity 901 shows a utilization pattern with a highlighted route looping back to the same step that was determined by analyzing at least the captured client-side user behavior data. As seen in identified automation opportunity 901, the loopback nature could be introducing needless redundancy such as a frequent task pattern that can be optimized. By analyzing the captured data, the redundancy is identified and surfaced as an automation opportunity. In the example shown, the analysis is performed using client-side data captured from the client but anonymized to remove privacy concerns. In some embodiments, the analysis is performed using the process of FIG. 4.

Figure 10:
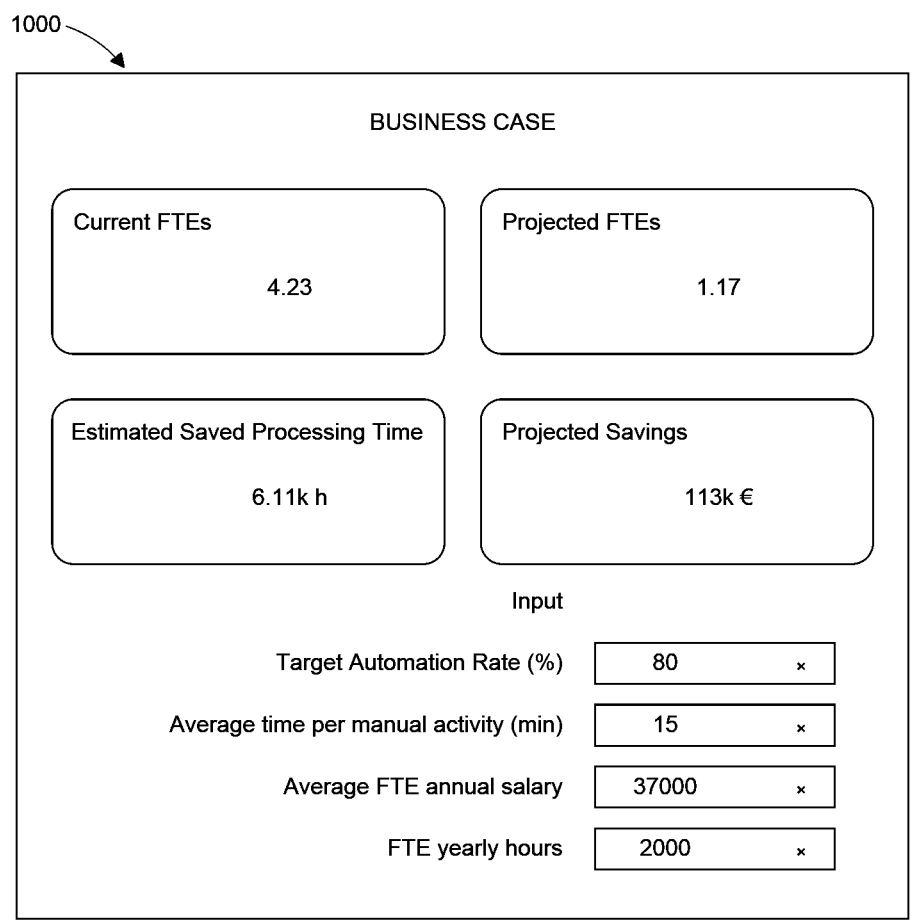
FIG. 10 is a diagram illustrating an embodiment of an automation user interface for a workflow process that includes provided estimated metrics associated with a proposed automation.

FIG. 10 is a diagram illustrating an embodiment of an automation user interface for a workflow process that includes provided estimated metrics associated with a proposed automation. In the example shown, automation user interface 1000 is an example embodiment of a user interface for presenting metrics and analytics data associated with an automation opportunity and a recommended proposed automation solution. The data is presented in the format of a business case to provide justification for installing the recommended automated solution for the identified automation opportunity. The metrics shown in FIG. 10 utilize data captured from monitoring a workflow process and are specific for the identified automation opportunity. In some embodiments, automation user interface 1000 is provided by a cloud service hosted by a cloud service server such as cloud service server 111 of FIG. 1. In some embodiments, an operator accesses automation user interface 1000 via a client such as client 105 of FIG. 1. In various embodiments, automation user interface 1000 is provided at 203 and/or 205 of FIG. 2 and/or 505 and/or 507 of FIG. 5. In some embodiments, the identified automation opportunity shown in automation user interface 1000 is identified automation opportunity 901 of FIG. 9.

In the example shown, automation user interface 1000 provides estimated metrics associated with a proposed automation in the form of an automation dashboard. The provided estimated performance metrics include projected full-time employees (FTEs), projected savings, and estimated saved processing time. Automation user interface 1000 also provides the current number of full-time employees (FTEs) for comparison. On the bottom half of automation user interface 1000, metrics associated with the workflow process are presented and can be configured. The metrics include the target automation rate, the average time per manual activity, the average FTE annual salary, and a number of yearly FTE hours. The metrics are presented as input values for determining the provided estimated metrics and can be configured and/or refined. In some embodiments, one or more of the default values are determined based on the analysis of captured workflow processes. For example, the time per manual activity can be determined by monitoring the workflow processes and the target automation rate can be determined by the recommended proposed automated solution. In some embodiments, the values are configured as part of configuring the process rules for the workflow process, for example, as part of step 401 of FIG. 4.

Figure 11:
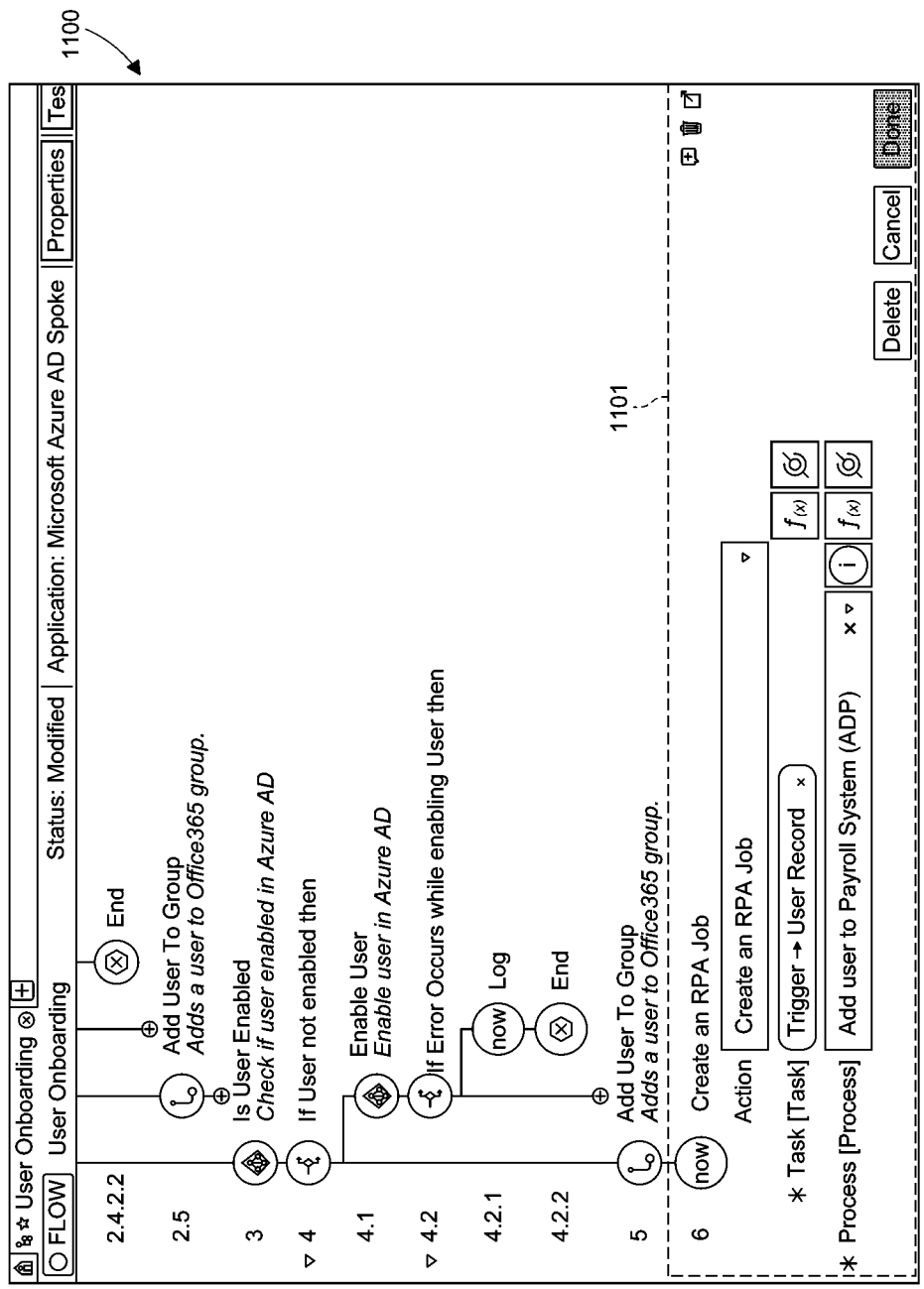
FIG. 11 is a diagram illustrating an embodiment of an automation user interface for installing a proposed automated solution for an identified automation opportunity of a workflow process.

FIG. 11 is a diagram illustrating an embodiment of an automation user interface for installing a proposed automated solution for an identified automation opportunity of a workflow process. In the example shown, automation user interface 1100 is an example embodiment of a user interface for presenting and installing an automation solution as part of a workflow process using a visualization of the workflow process. In some embodiments, the example of FIG. 11 is presented automatically or in response to the selection of an automated solution by an operator. As shown, automation user interface 1100 includes proposed automation solution user interface element 1101 for configuring and installing the automated solution to replace manual steps. In some embodiments, automation user interface 1100 is provided by a cloud service hosted by a cloud service server such as cloud service server 111 of FIG. 1. In some embodiments, operator accesses automation user interface 1100 via a client such as client 105 of FIG. 1. In various embodiments, automation user interface 1100 is provided at 203, 205, and/or 209 of FIG. 2 and/or 505 and/or 507 of FIG. 5.

In the example shown, automation user interface 1100 displays the workflow process as a flow of workflow process steps. An additional automated step is shown using automation solution user interface element 1101 to replace identified manual steps. Automation solution user interface element 1101 allows the operator to confirm and configure the creation of the automated step. In the example of FIG. 11, the automated step utilizes a robotic process automation (RPA) job that automates manual service tasks. In various embodiments, the user interface allows the operator to configure and/or refine the automated solution. For example, in the case of automation solution user interface element 1101, the operator can configure the trigger used for the automated step by associating the automated step with a database user record. The operator can further confirm that the automated step invokes a specific service process or task to automate the adding of a user to the payroll system. In various embodiments, once the automated solution is installed, newly captured data can be used to track the improvement of the automation as compared to the pre-automation workflow.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   collecting at least service task data and application utilization data;
   analyzing the collected data to determine a utilization pattern of a workflow created and managed using a cloud-based business workflow management service;
   automatically identifying a computer automation opportunity based on the determined utilization pattern, wherein the computer automation opportunity targets a group of specific plurality of steps that is a portion of the workflow associated with a bottleneck in the workflow, wherein the bottleneck is associated with repeating the same group of specific plurality steps included in the workflow multiple times;
   providing an automatically generated recommendation of an automation solution among a plurality of automation solution candidates for the identified computer automation opportunity, wherein the automatically generated recommendation is associated with a revision of the workflow that includes an automatically identified chat bot automation of the bottleneck associated with repeating the same group of specific plurality steps and the chat bot automation is recommended for the bottleneck based on matching an identified predefined set of workflow process characteristics to the workflow with the bottleneck; and
   tracking analytics associated with the automatically identified chat bot automation, including conversation analytics to quantify benefits of the automatically identified chat bot automation.

2. The method of claim 1, wherein the collected application utilization data is received via an installed client agent.

3. The method of claim 2, wherein the installed client agent is configured to monitor two or more application processes of a client device.

4. The method of claim 3, wherein the installed client agent is configured to monitor operating system events of the client device.

5. The method of claim 1, further comprising:
   receiving one or more process rules configured for the workflow; and
   applying the configured one or more process rules to the collected data, wherein analyzing the collected data to determine the utilization pattern includes determining one or more process analytics results for the workflow.

6. The method of claim 1, further comprising:
   presenting a visualization of the utilization pattern via a cloud-based automation user interface.

7. The method of claim 6, further comprising:
   determining estimated metrics of the automatically generated recommendation of the automation solution; and
   providing the determined estimated metrics via the cloud-based automation user interface.

8. The method of claim 1, wherein automatically identifying the computer automation opportunity includes analyzing audit logs of a cloud-based service and infrastructure data of the cloud-based service.

9. The method of claim 1, wherein the provided automatically generated recommendation of the automation solution is associated with utilizing a server-side process robot.

10. The method of claim 1, wherein the provided automatically generated recommendation of the automation solution includes installing an automated service task process to replace manually performed service tasks.

11. The method of claim 1, wherein the provided automatically generated recommendation of the automation solution includes generating a machine learning model to infer results associated with the utilization pattern.

12. A system, comprising:
   one or more processors; and
   a memory coupled to the one or more processors, wherein the memory is configured to provide the one or more processors with instructions which when executed cause the one or more processors to:
   collect at least service task data and application utilization data;
   analyze the collected data to determine a utilization pattern of a workflow created and managed using a cloud-based business workflow management service;
   automatically identify a computer automation opportunity based on the determined utilization pattern, wherein the computer automation opportunity targets a group of specific plurality of steps that is a portion of the workflow associated with a bottleneck in the workflow, wherein the bottleneck is associated with repeating the same group of specific plurality steps included in the workflow multiple times;
   provide an automatically generated recommendation of an automation solution among a plurality of automation solution candidates for the identified computer automation opportunity, wherein the automatically generated recommendation is associated with a revision of the workflow that includes an automatically identified chat bot automation of the bottleneck associated with repeating the same group of specific plurality steps and the chat bot automation is recommended for the bottleneck based on matching an identified predefined set of workflow process characteristics to the workflow with the bottleneck; and track analytics associated with the automatically identified chat bot automation, including conversation analytics to quantify benefits of the automatically identified chat bot automation.

13. The system of claim 12, wherein the collected application utilization data is received via an installed client agent.

14. The system of claim 13, wherein the installed client agent is configured to monitor two or more application processes of a client device.

15. The system of claim 14, wherein the installed client agent is configured to monitor operating system events of the client device.

16. The system of claim 12, wherein the memory is further configured to provide the one or more processors with instructions which when executed cause the one or more processors to:
receive one or more process rules configured for the workflow; and
apply the configured one or more process rules to the collected data, wherein analyzing the collected data to determine the utilization pattern includes determining one or more process analytics results for the workflow.

17. The system of claim 12, wherein the memory is further configured to provide the one or more processors with instructions which when executed cause the one or more processors to:
present a visualization of the utilization pattern via a cloud-based automation user interface.

18. The system of claim 17, wherein the memory is further configured to provide the one or more processors with instructions which when executed cause the one or more processors to:
determine estimated metrics of the automatically generated recommendation of the automation solution; and
provide the determined estimated metrics via the cloud-based automation user interface.

19. The system of claim 12, wherein automatically identifying the computer automation opportunity includes analyzing audit logs of a cloud-based service and infrastructure data of the cloud-based service.

20. A computer program product, the computer program product being embodied in a non-transitory computer readable storage medium and comprising computer instructions for:
collecting at least service task data and application utilization data;
analyzing the collected data to determine a utilization pattern of a workflow created and managed using a cloud-based business workflow management service;
automatically identifying a computer automation opportunity based on the determined utilization pattern, wherein the computer automation opportunity targets a group of specific plurality of steps that is a portion of the workflow associated with a bottleneck in the workflow, wherein the bottleneck is associated with repeating the same group of specific plurality steps included in the workflow multiple times;
providing an automatically generated recommendation of an automation solution among a plurality of automation solution candidates for the identified computer automation opportunity, wherein the automatically generated recommendation is associated with a revision of the workflow that includes an automatically identified chat bot automation of the bottleneck associated with repeating the same group of specific plurality steps and the chat bot automation is recommended for the bottleneck based on matching an identified predefined set of workflow process characteristics to the workflow with the bottleneck; and
tracking analytics associated with the automatically identified chat bot automation, including conversation analytics to quantify benefits of the automatically identified chat bot automation.

* * * * *